US011258887B2

United States Patent
Pardo et al.

(10) Patent No.: US 11,258,887 B2
(45) Date of Patent: Feb. 22, 2022

(54) PAYLOAD CACHE

(71) Applicant: MELLANOX TECHNOLOGIES, LTD., Yokneam (IL)

(72) Inventors: Ilan Pardo, Ramat Hasharon (IL); Mark B. Rosenbluth, Uxbridge, MA (US); Idan Burstein, Carmiel (IL); Rui Xu, Marlborough, MA (US); Oded Lempel, Amikam (IL); Tsofia Eshel, Eshchar (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 79 days.

(21) Appl. No.: 16/908,776

(22) Filed: Jun. 23, 2020

(65) Prior Publication Data

US 2021/0400124 A1    Dec. 23, 2021

Related U.S. Application Data

(63) Continuation-in-part of application No. 16/907,347, filed on Jun. 22, 2020.

(51) Int. Cl.
*H04L 29/06* (2006.01)
*G06F 12/0875* (2016.01)
*G06F 13/40* (2006.01)
*H04L 12/879* (2013.01)
*H04L 29/08* (2006.01)
*H04L 69/22* (2022.01)
*H04L 49/901* (2022.01)
(Continued)

(52) U.S. Cl.
CPC ........ *H04L 69/22* (2013.01); *G06F 12/0875* (2013.01); *G06F 13/4027* (2013.01); *H04L 49/901* (2013.01); *H04L 67/2842* (2013.01); *H04L 69/324* (2013.01); *G06F 2212/1032* (2013.01)

(58) Field of Classification Search
None
See application file for complete search history.

(56) References Cited

U.S. PATENT DOCUMENTS 8,051,212 B2     11/2011   Kagan et al.
2003/0145136 A1*  7/2003   Tierney ............... G06F 9/3834
                                                        710/3
(Continued)

OTHER PUBLICATIONS

Pardo et al., U.S. Appl. No. 16/907,347, filed Jun. 22, 2020.

*Primary Examiner* — Diane L Lo
(74) *Attorney, Agent, or Firm* — Kligler & Associates Patent Attorneys Ltd

(57) ABSTRACT

In one embodiment, a computer system includes a payload sub-system including interfaces to connect with respective devices, transfer data with the respective devices, and receive write transactions from the received write transactions into payload data and control data, and a payload cache to store the classified payload data, and a processing unit (PU) sub-system including a local PU cache to store the classified control data, wherein the payload cache and the local PU cache are different physical caches in respective different physical locations in the computer system, and processing core circuitry configured to execute software program instructions to perform control and packet processing responsively to the control data stored in the local PU cache.

21 Claims, 6 Drawing Sheets

(51) Int. Cl.
*H04L 69/324* (2022.01)
*H04L 67/568* (2022.01)

(56) References Cited

U.S. PATENT DOCUMENTS

| | | | |
|---|---|---|---|
| 2009/0164731 A1* | 6/2009 | Le | G06F 12/0831 711/130 |
| 2010/0095064 A1* | 4/2010 | Aviles | H04L 67/1097 711/118 |
| 2014/0095644 A1* | 4/2014 | Dharmalingam | H04L 67/2842 709/213 |
| 2015/0271244 A1 | 9/2015 | Bloch et al. | |

* cited by examiner

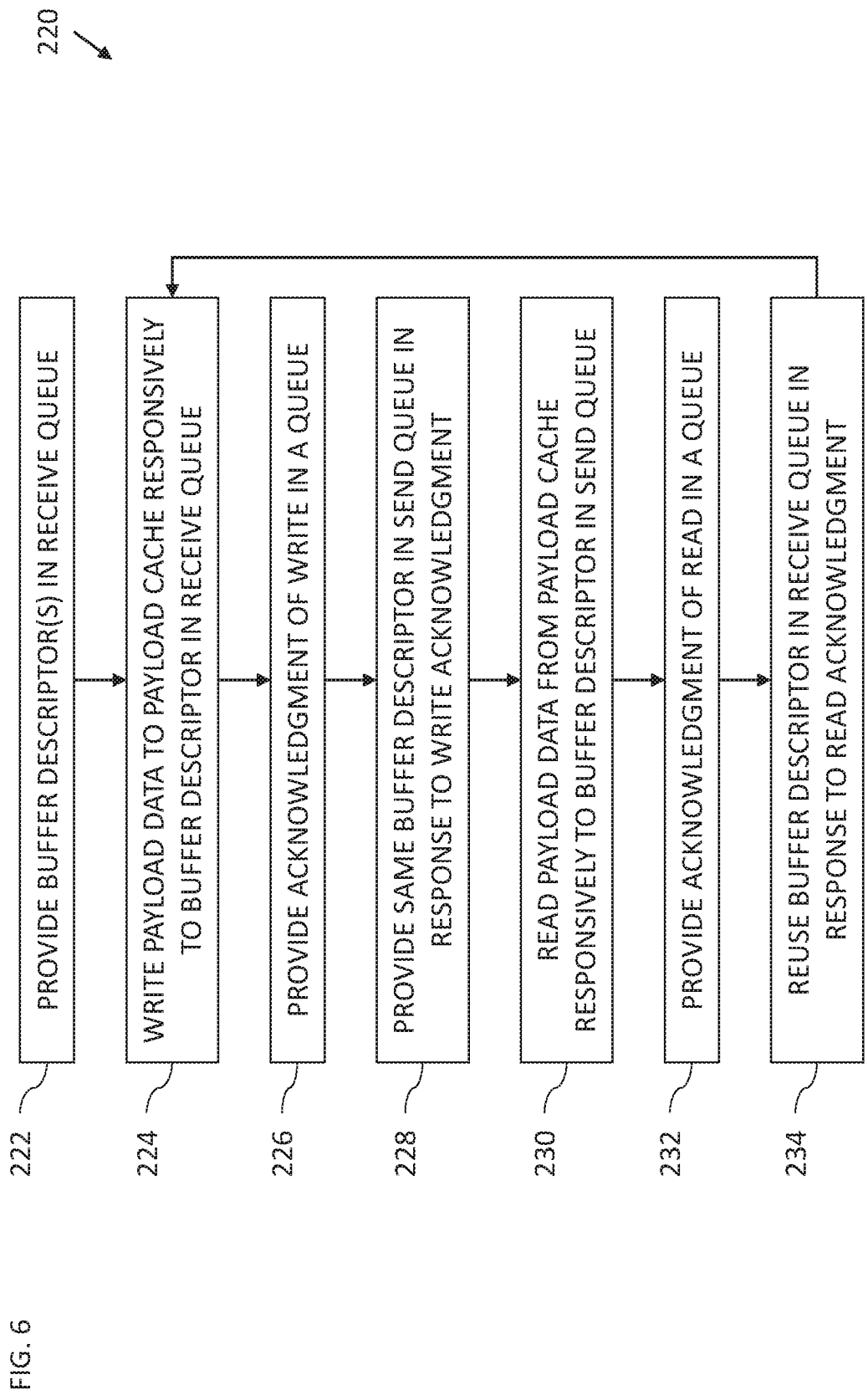

US 11,258,887 B2

PAYLOAD CACHE

RELATED APPLICATION INFORMATION

The present application is a Continuation-In-Part of U.S. patent application Ser. No. 16/907,347 filed Jun. 22, 2020, the disclosure of which is hereby incorporated herein by reference.

FIELD OF THE INVENTION

The present invention relates to computer systems, and in particular, but not exclusively, to data caching.

BACKGROUND

A network interface controller (NIC) is typically a peripheral component interconnect express (PCIe) card that plugs into a server or storage box to enable connectivity to an Ethernet network. A SmartNIC provides functionality beyond simple connectivity, and implements network traffic processing on the NIC that would necessarily be performed by the central processing unit (CPU) in the case of a foundational NIC.

US Patent Publication 2015/0271244 of Bloch, et al., describes a network interface device that includes a host interface for connection to a host processor and a network interface, which is configured to transmit and receive data packets over a network, and which comprises multiple distinct physical ports configured for connection to the network. Processing circuitry is configured to receive, via one of the physical ports, a data packet from the network and to decide, responsively to a destination identifier in the packet, whether to deliver a payload of the data packet to the host processor via the host interface or to forward the data packet to the network via another one of the physical ports.

U.S. Pat. No. 8,051,212 to Kagan, et al., describes a network interface adapter including an outgoing packet generator, adapted to generate an outgoing request packet for delivery to a remote responder responsive to a request submitted by a host processor and a network output port, coupled to transmit the outgoing request packet over a network to the remote responder. A network input port receives an incoming response packet from the remote responder, in response to the outgoing request packet sent thereto, as well as an incoming request packet sent by a remote requester. An incoming packet processor receives and processes both the incoming response packet and the incoming request packet, and causes the outgoing packet generator, responsive to the incoming request packet, to generate, in addition to the outgoing request packet, an outgoing response packet for transmission to the remote requester.

SUMMARY

There is provided in accordance with an embodiment of the present disclosure, a computer system, including a payload sub-system including interfaces configured to connect with respective devices, transfer data with the respective devices, and receive write transactions from the respective devices, a classifier configured to classify the received write transactions into payload data and control data, and a payload cache configured to store the classified payload data, and a processing unit (PU) sub-system including a local PU cache configured to store the classified control data, wherein the payload cache and the local PU cache are different physical caches in respective different physical locations in the computer system, and processing core circuitry configured to execute software program instructions to perform control and packet processing responsively to the control data stored in the local PU cache.

Further in accordance with an embodiment of the present disclosure the processing core circuitry is configured to manage transfer of the classified payload data from a first one of the devices to a second one of the devices via the interfaces and the payload cache.

Still further in accordance with an embodiment of the present disclosure the first device includes an external storage device directly connected to one of the interfaces, and the second device includes a network node connected to one of the interfaces via a network.

Additionally, in accordance with an embodiment of the present disclosure the first device includes a first network node connected to one of the interfaces via a network, and the second device includes a second network node connected to one of the interfaces via the network.

Moreover, in accordance with an embodiment of the present disclosure the processing core circuitry is configured to manage transfer of the classified payload data from the first device to the second device via the interfaces and the payload cache without the software accessing the payload cache.

Further in accordance with an embodiment of the present disclosure the processing core circuitry is configured to manage transfer of the classified payload data from the first device to the second device via the interfaces and the payload cache without the software storing any of the classified payload data in the local PU cache.

Still further in accordance with an embodiment of the present disclosure the processing core circuitry is configured to generate buffer descriptors of respective free memory locations in the payload cache, and provide the buffer descriptors to the interfaces, and the interfaces are configured to transfer the payload data from the first device to the second device via the payload cache responsively to the provided buffer descriptors.

Additionally, in accordance with an embodiment of the present disclosure the processing core circuitry is configured to manage at least one queue responsively to the buffer descriptors, the interfaces being configured to transfer the payload data from the first device to the second device via the payload cache responsively to the at least one queue.

Moreover, in accordance with an embodiment of the present disclosure the payload cache is physically located closer to the interfaces than the processing core circuitry, and the local PU cache is physically located closer to the processing core circuitry than the interfaces.

Further in accordance with an embodiment of the present disclosure the classifier is configured to classify the received write transactions into payload data and control data responsively to one or more of the following data type, packet descriptor data, packet header data, data size, steering tag data, or address data.

Still further in accordance with an embodiment of the present disclosure, the system includes a memory configured to store data across a plurality of memory locations, the processing core circuitry being configured to cache cache-lines read from the memory at respective ones of the memory locations into the local PU cache, an interconnect configured to manage read and write operations of the memory and the local PU cache, maintain local cache location data of the cached cache-lines the respective memory locations of the cached cache-lines, and maintain coherence of the memory, and wherein the classifier is configured to classify the received write transactions into payload data and control data responsively to at least some of the local cache location data and respective memory locations of the write transactions.

Additionally in accordance with an embodiment of the present disclosure the payload sub-system further includes at least one hardware accelerator configured to perform any one or more of the following compute a checksum from the payload data stored in the payload cache, perform a redundancy check from the payload data stored in the payload cache, compress at least some of the payload data stored in the payload cache, or encrypt at least some of the payload data stored in the payload cache.

There is also provided in accordance with another embodiment of the present disclosure a method, including receiving write transactions from connected devices, classifying the received write transactions into payload data and control data, storing the classified payload data in a payload cache, storing the classified control data in a local processing unit (PU) cache, wherein the payload cache and the local PU cache are different physical caches in respective different physical locations in a computer system, and executing software program instructions to perform control and packet processing responsively to the control data stored in the local PU cache.

Moreover, in accordance with an embodiment of the present disclosure the executing software program instructions includes managing transfer of the classified payload data from a first one of the devices to a second one of the devices via the payload cache.

Further in accordance with an embodiment of the present disclosure the software program manages the transfer of the classified payload data from the first device to the second device via the payload cache without the accessing the payload cache.

Still further in accordance with an embodiment of the present disclosure the software program manages the transfer of the classified payload data from the first device to the second device via the payload cache without storing any of the classified payload data in the local PU cache.

Additionally, in accordance with an embodiment of the present disclosure, the method includes generating buffer descriptors of respective free memory locations in the payload cache, and transferring the payload data from the first device to the second device via the payload cache responsively to the buffer descriptors.

Moreover, in accordance with an embodiment of the present disclosure, the method includes managing at least one queue responsively to the buffer descriptors, and transferring the payload data from the first device to the second device via the payload cache responsively to the at least one queue.

Further in accordance with an embodiment of the present disclosure the classifying includes classifying the received write transactions into payload data and control data responsively to one or more of the following: data type, packet descriptor data, packet header data, data size, steering tag data, or address data.

Still further in accordance with an embodiment of the present disclosure the classifying includes classifying the received write transactions into payload data and control data responsively to local cache location data maintained in a directory, which is maintained to provide coherence of a memory, and respective memory locations of the write transactions.

Additionally in accordance with an embodiment of the present disclosure, the method includes performing any one or more of the following computing a checksum from the payload data stored in the payload cache, performing a redundancy check from the payload data stored in the payload cache, compressing at least some of the payload data stored in the payload cache, or encrypting at least some of the payload data stored in the payload cache.

BRIEF DESCRIPTION OF THE DRAWINGS

The present invention will be understood from the following detailed description, taken in conjunction with the drawings in which:

FIG. 6 is a flowchart including steps in a method to transfer payload data based on queues in the system of FIG. 1.

DESCRIPTION OF EXAMPLE EMBODIMENTS

Overview

Figure 1:
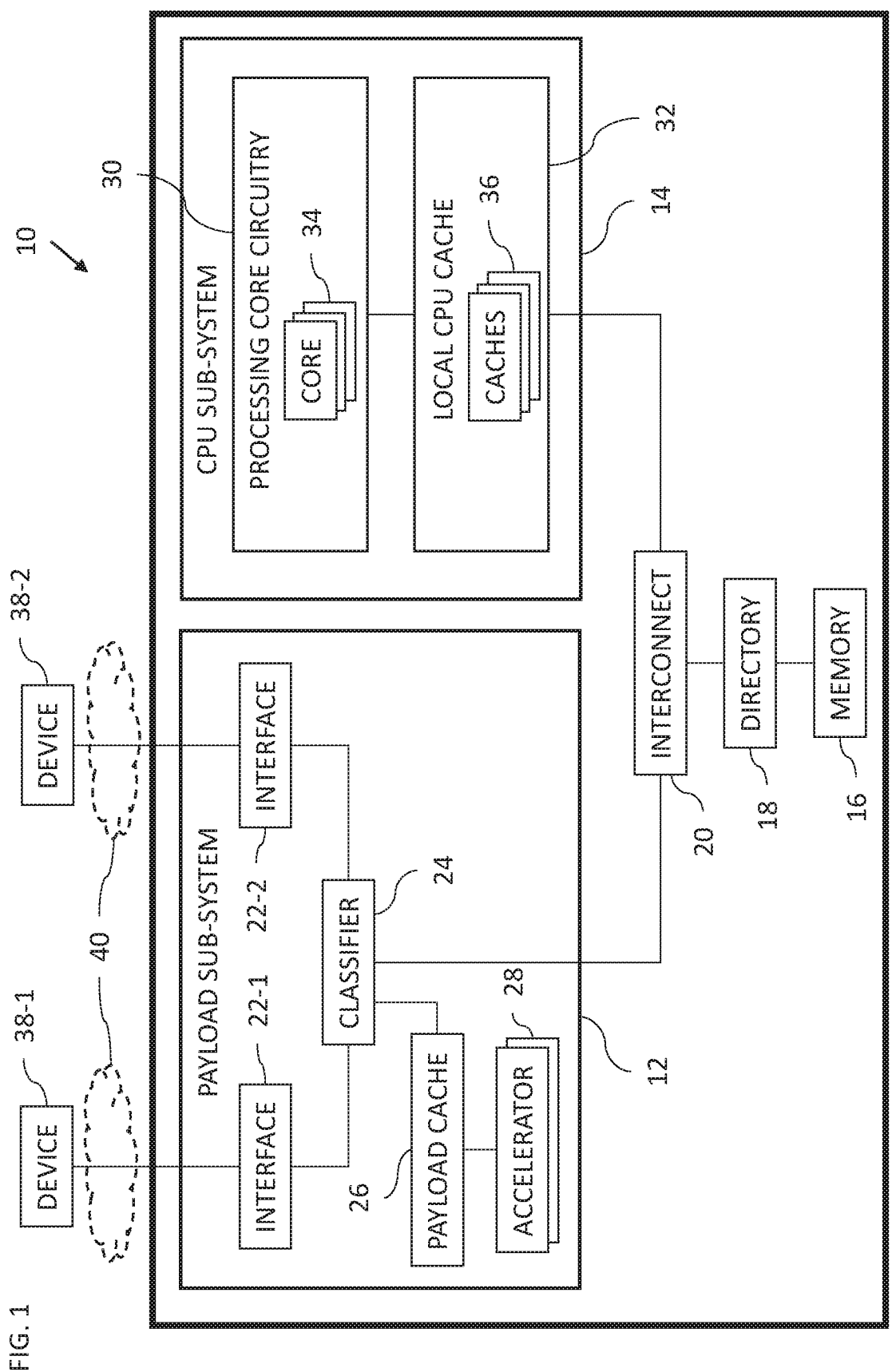
FIG. 1 is a block diagram view of a computer system constructed and operative in accordance with an embodiment of the present invention.

A SmartNIC, storage controller, or other interface may process incoming packets and later forward modified packets to a target, for example, a host processor, network node, or an external solid-state drive (SSD) for example. Some of the packets (or parts thereof) may be processed by hardware accelerators or general-purpose processors, for example.

By way of another example, a device connected to a server via a network may request content stored on an external disk directly connected via a peripheral component interconnect express (PCIe) interface to the server. The data may be retrieved from the external disk, optionally processed by hardware accelerators, and written into system memory (e.g., dynamic random-access memory (DRAM)) and once in memory there is a "store and forward" process managed by a central processing unit (CPU) of the server to activate a network interface controller (NIC) of the server to send the data to the remote device over the network.

The packet processing, may include per packet processing, involving access to packet descriptors and packet headers as well as to software-maintained context databases, where most of the packet payload is not accessed. This processing is typically performed using a CPU.

Optionally, payload data processing such as checking data integrity, data compression and data encryption may be performed typically by dedicated hardware accelerators.

As per packet processing is sensitive to memory access latency and involves access to limited parts of the packets, caching the data as close as possible to the CPU is advantageous. For payload data processing, it is beneficial to cache the payload data onto the die to avoid external memory bandwidth. Within the die, it is beneficial to locate the payload close to hardware accelerators and input/output (I/O) interfaces in order to reduce on-chip interconnect bandwidth. In both cases, per packet processing and payload data processing, cache capacity comprehension is important to correctly tune system performance.

One solution is to use local caches near the CPU and a larger system cache shared between the CPU and the peripherals (such as the accelerators and/or the I/O interfaces).

The above solution suffers from various problems. First, the shared cache location is non-optimal for both access by the CPU and the peripherals. This may result is high average read latency which in turn has a crucial negative effect on CPU performance. This may also necessitate high bandwidth interconnects in order to transfer the payload data between the I/O interfaces and optionally the accelerators. Second, as the CPU is also performing other tasks apart from data transfer between the I/O interfaces, software running on the CPU may evict payload data from the shared cache to memory (e.g., DRAM) further downgrading performance of the transfer process. Third, it is hard to analyze the shared cache capacity allocation between software and hardware in order to correctly tune system performance.

Embodiments of the present invention solve the above problems by splitting the caching of data written from external devices, via the I/O interfaces, into payload data and control data. Payload data is stored in a payload cache generally physically located closer to the I/O interfaces and the accelerators, while control data is cached in a local CPU cache generally physically located closer to the CPU. In disclosed embodiments, there is no need for a shared cache for storing both payload and control data. In some embodiments, the CPU and local CPU cache may be replaced by any suitable processing unit (PU) and local PU cache, for example, a graphics processing unit (GPU) and a GPU cache.

The term "payload data", as used in the specification and claims, is defined as data which is received from an external device via an I/O interface and transferred to another external device via an I/O interface without needing to be read for use by the CPU.

The term "control data", as used in the specification and claims, is defined as data which is received from an external device via an PO interface and needs to be read for use by the CPU.

In some embodiments, write transactions received from the respective external devices are classified by a classifier into payload data and control data. The classifier may use any suitable method to identify payload data and control data. In some embodiments, the classifier classifies the received write transactions into payload data and control data according to one or more of the following: data type, packet descriptor data, packet header data, data size, steering tag data, or address data. In some embodiments, data provided by a memory coherence directory may be used to classify the data.

Embodiments of the present invention reduce latency and reduce interconnect bandwidth requirements associated with using a shared cache as well as preventing CPU processes which are unrelated to the transfer of payload data from evicting payload data to memory. For example, if there is an overflow of the local CPU cache, the overflow will go to memory without interfering with the payload data and vice-versa for the payload. As the CPU experiences low read latency, processing performance is improved. Software running on the CPU may tune its data structures and behaviors to its dedicated local CPU cache. The payload cache may be sized based on the wire speed and known peripheral latency, without the need to consider unexpected software behavior. Providing the payload cache near the I/O interfaces and the accelerator(s) frees routing resources near the CPU for processing. Additionally, the I/O interfaces and accelerator(s) bandwidth behavior is easy to analyze, thus allowing optimization of the interconnect design in the region of the I/O interfaces and the accelerator(s). Similarly, the locations of the payload cache and CPU local cache allows interconnects to be reduced along with less interconnect complexity.

System Description

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Figure 2:
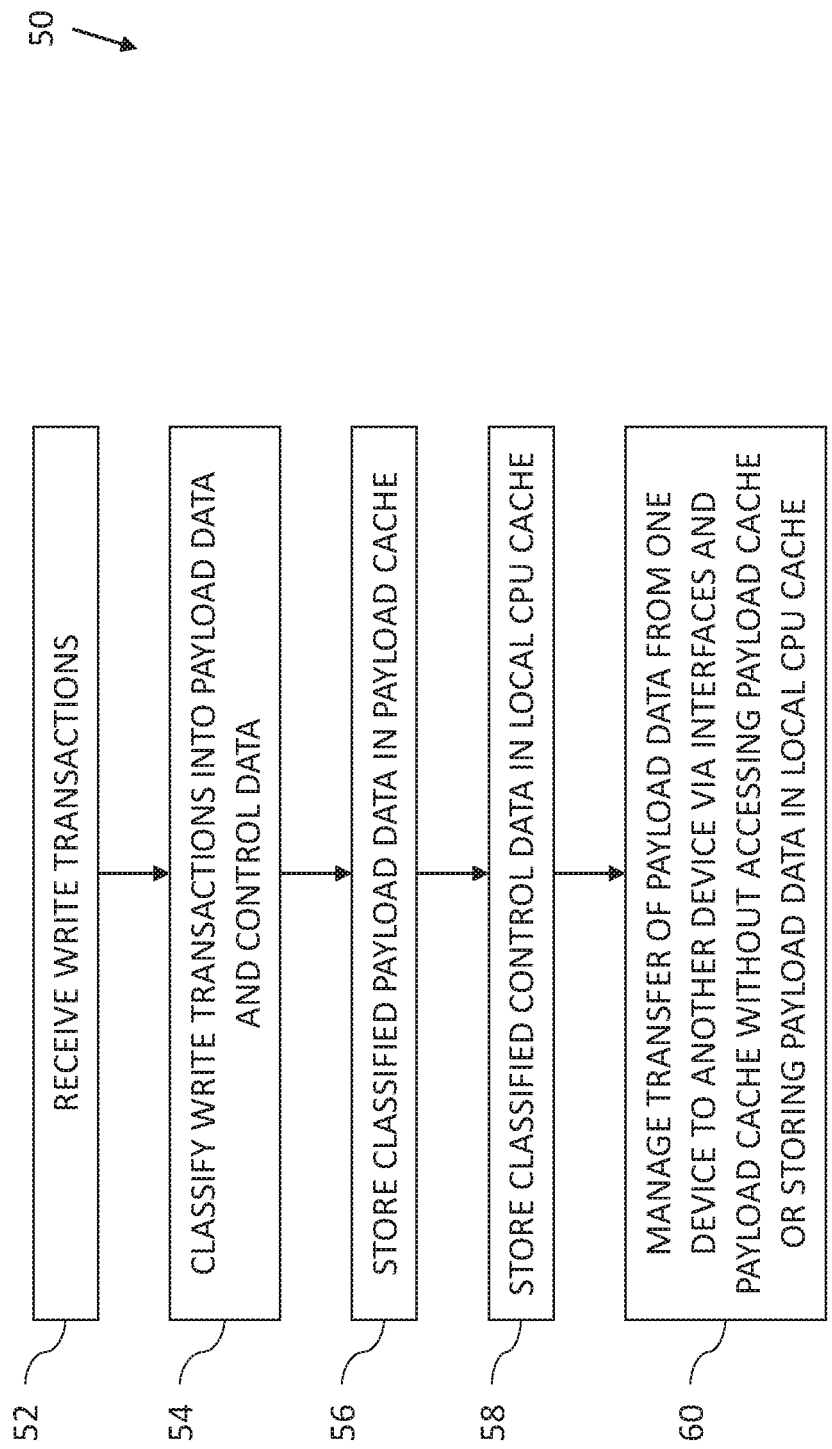
FIG. 2 is a flowchart including steps in a method of managing data in the system of FIG. 1.

Reference is now made to FIG. 1, which is a block diagram view of a computer system 10 constructed and operative in accordance with an embodiment of the present invention. Reference is also made to FIG. 2, which is a flowchart 50 including steps in a method of managing data in the system 10 of FIG. 1.

The computer system 10 includes a payload sub-system 12, a central processing unit (CPU) sub-system 14, a memory 16, a directory 18, and an interconnect 20. The payload sub-system 12 includes a plurality of interfaces 22, a classifier 24, a payload cache 26, and optionally one or more accelerators 28. The CPU sub-system 14 includes processing core circuitry 30 and a local CPU cache 32. The processing core circuitry 30 may include one or more processing cores 34. The local CPU cache 32 may include one or more caches 36. The payload sub-system 12, the CPU sub-system 14, interconnect 20, directory 18, and memory 16 may be implemented on a single die or may be implemented over two or more dies.

In some embodiments, the CPU sub-system 14 may be implemented as any suitable processing unit (PU) sub-system, e.g., a graphics processing unit (GPU) sub-system including one or more graphics processing cores, with any suitable local PU cache, e.g., a local GPU cache.

An external device 38-1 is connected to the computer system 10 via the interface 22-1, and an external device 38-2 is connected to the computer system 10 via the interface 22-2. The computer system 10 may include more than two interfaces 22 connected to more than two respective external devices 38.

The external device 38 may include any suitable external devices, for example, an external storage device (e.g., a non-volatile memory express (NVMe) SSD) or a network node.

In some embodiments, the external device 38-1 includes an external storage device directly connected (e.g., via a cable without a network) to the interface 22-1, and the external device 38-2 includes a network node connected to the interface 22-2 via a network 40. In these embodiments, the interface 22-1 may include any suitable interface, for example, a PCIe interface, and the interface 22-2 may include a NIC.

In some embodiments, the external device 38-1 includes a network node connected (e.g., via a network cable, or Bluetooth) to the interface 22-1 via the network 40, and the external device 38-2 includes another network node connected (e.g., via a network cable or Bluetooth) to the interface 22-2 via the network 40 or via another network. In these embodiments, each interface 22-1, 22-2 includes a NIC.

In some embodiments, the external devices 38-1, 38-2 may be directly connected via the interfaces 22 to the computer system 10.

The memory 16 (e.g., DRAM or any suitable RAM) is configured to store data across a plurality of memory locations. The interconnect 20 is configured to: manage read and write operations of the memory 16, the local CPU cache 32, and the payload cache 26; maintain local cache location data in the directory 18 of cached cache-lines according to the respective memory locations of the cached cache-lines; and maintain coherence of the memory 16 in accordance with a suitable memory coherence protocol.

The payload cache 26 and the local CPU cache 32 are different physical caches in respective different physical locations in the computer system 10. The payload cache 26 is generally physically located closer to the interfaces 22 than to the processing core circuitry 30. The local CPU cache 36 is generally physically located closer to the processing core circuitry 30 than to the interfaces 22. The term A being "physically closer" to B than to C, as used in the specification and claims, is defined herein to mean that a connection between A and B is faster and/or cheaper than an connection between A and C.

The interfaces 22 are configured to: connect (directly, e.g. via a cable without a network, and/or indirectly via a network) with respective external devices 38. The interfaces 22 are configured to transfer data with the respective devices 38, for example, transfer data from the external device 38-1 to the external device 38-2. The interfaces 22 are configured to receive (block 52) write transactions from the respective devices 38. The write transactions may include packets or data elements, with any packet or data element including payload data and/or control data. For example, a data element may include a header section, which is control data, and a payload section, which is payload data. A data element may include a header section and a payload section which are both classified as control data, e.g., a data transfer request or notification or acknowledgment. A data element may include only payload data.

The classifier 24 is configured to receive the write transactions from the interfaces 22 and classify (block 54) the received write transactions into payload data and control data. The control data may include control structures and packet headers. In some embodiments, the functionality of the classifier 24 may be incorporated into each interface 22.

The classification may be performed using any suitable method and criteria. For example, an interface such as a NIC may have a detailed comprehension of the written data type, packet descriptors and packet headers. This information may be used to determine if write transactions (e.g., received packets) are payload data or control data, or which parts of the write transactions are payload data or control data. For example, packet descriptors and packet headers may be classified as control data, while packet payload sections may be classified as payload data. By way of another example, an interface device, such as a PCIe interface, may use heuristics to estimate whether a write transaction is control data or payload data. For example, a small sized transaction may suggest a control structure, which should be stored in the local CPU cache 32, while a large sized transaction may be stored in the payload cache 26. A PCIe "steering tag" from an external device may be used to encode whether the write transaction is control data or payload data. An indication of whether data is payload data or control data may be encoded by a software device driver in the address (e.g., in the most significant bits of the address) used in the write transaction.

Therefore, in some embodiments, the classifier 24 is configured to classify the received write transactions into payload data and control data responsively to one or more of the following: data type; packet descriptor data; packet header data; data size; steering tag data; or address data.

In some embodiments, the classifier 24 is configured to classify the received write transactions into payload data and control data responsively to local cache location data (stored in the directory 18) and respective memory locations of the write transactions. For example, if a write transaction is associated with a particular memory location in the memory 16, the directory 18 may be searched to find cached locations associated with that memory location to determine whether data from that memory location was cached in the payload cache 26 or the local CPU caches 32. The result of the search then provides an indication whether the received write transaction should be classified as payload data or control data.

In practice, some or all of the functions of the classifier 24 may be combined in a single physical component or, alternatively, implemented using multiple physical components. These physical components may comprise hard-wired or programmable devices, or a combination of the two. In some embodiments, at least some of the functions of the classifier 24 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The payload cache 26 is configured to store (block 56) the classified payload data, which is in transit from the interface 22-1 to the interface 22-2. The payload data is written to the payload cache 26 by the interface 22-1.

The local CPU cache 32 is configured to store (block 58) the classified control data and other data used by software being executed. The local CPU cache 32 may include multiple cache levels either per core 34, per core cluster or shared between all the cores 34.

The processing core circuitry 30 is configured to execute software program instructions to: perform control and packet processing responsively to the control data stored in the local CPU cache 32 (and optionally responsively to data stored in any other location); cache cache-lines read from the memory 16 at respective ones of the memory locations into the local CPU cache 36; and manage transfer (block 60) of the classified payload data from the external device 38-1 to the external device 38-2 via the interfaces 22 and the payload cache 26.

In some embodiments, the software running on the processing core circuitry 30 is configured to manage transfer of the classified payload data from the device 38-1 to the device 38-2 via the interfaces 22 and the payload cache 26 without the software accessing (e.g., reading from, or writing to) the payload cache 26.

In some embodiments, the software running on the processing core circuitry 30 is configured to manage transfer of the classified payload data from the device 38-1 to the device 38-2 via the interfaces 22 and the payload cache 26 without the software storing any of the classified payload data in the local CPU cache 32.

In practice, some or all of the functions of the processing core circuitry 30 may be combined in a single physical component or, alternatively, implemented using multiple physical components. In some embodiments, at least some of the functions of the processing core circuitry 30 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The accelerator(s) 28 are configured to perform any one or more of the following: compute a checksum from the payload data stored in the payload cache 26; perform a redundancy check from the payload data stored in the payload cache 26; compress at least some of the payload data stored in the payload cache 26; or encrypt at least some of the payload data stored in the payload cache 26.

Data requests and data transfers may be processed using any suitable method. The description with reference to FIGS. 3 and 4 describes one method to process data requests. The description with reference to FIGS. 5 and 6 describes another method.

Figure 3:
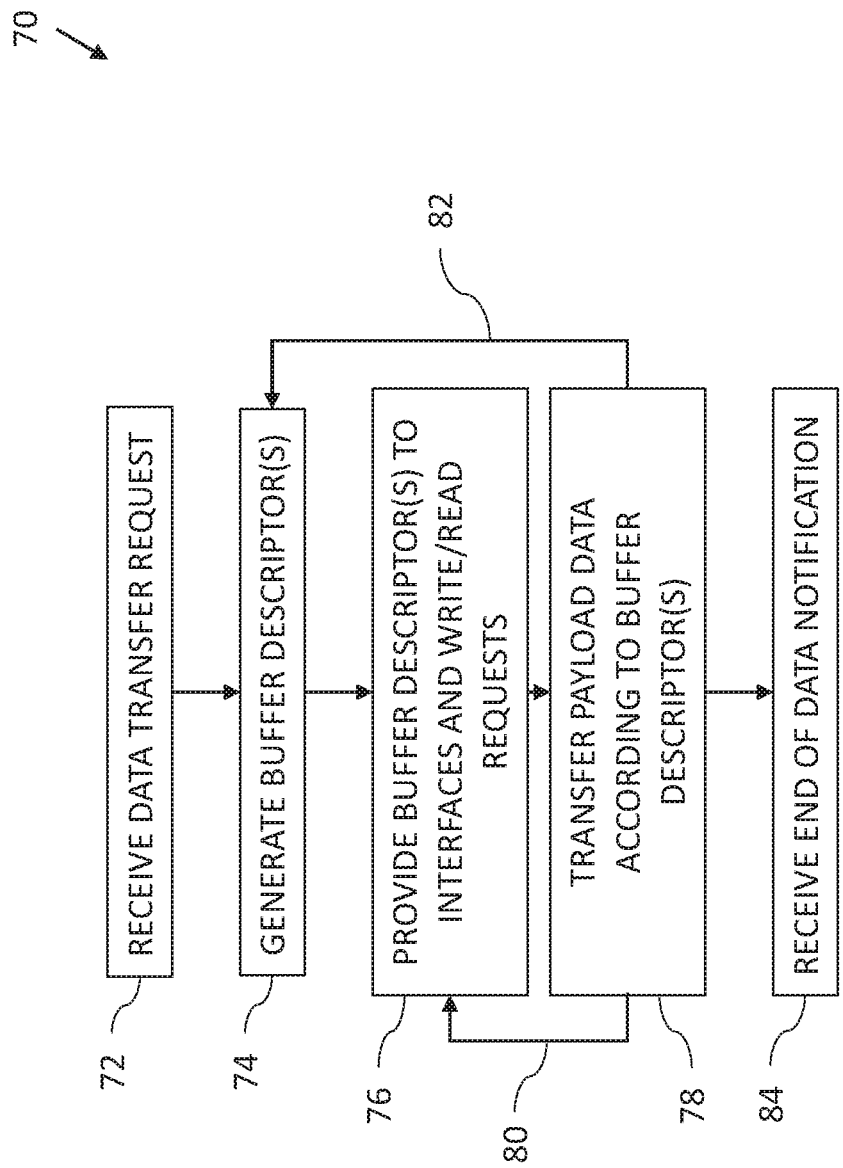
FIG. 3 is a flowchart including steps in a method to fulfil a data request in the system of FIG. 1.

Reference is now made to FIG. 3, which is a flowchart 70 including steps in a method to fulfil a data request in the system 10 of FIG. 1. Reference is also made to FIG. 1.

The interface is configured to receive (block 72) a data transfer request from the external device 38-2. The requested data is stored in the external device 38-1. The data transfer request is classified as control data by the classifier 24 and transferred to the local CPU cache 32 for processing by software of the processing core circuitry 30. In some embodiments, the control data is stored in any suitable location (e.g., any free cache line) in the local CPU cache 32. The processing core circuitry 30 is configured to generate (block 74) one or more buffer descriptors indicative of a free memory location or locations in the payload cache 26. The processing core circuitry 30 is configured to provide (block 76) the buffer descriptor(s) to the interfaces 22. The processing core circuitry 30 may provide the buffer descriptors (s) to the interfaces 22 via write and read requests to the external devices 38 as described in more detail with reference to FIG. 4. The interfaces 22 are configured to transfer (block 78) the payload data (provided by the device 38-1) from the device 38-1 to the device 38-2 via the payload cache 26 responsively to the provided buffer descriptor(s). The buffer descriptors are used by the interfaces 22 to write data to the payload cache 26 and read data from the payload cache 26 as part of the data transfer request, as will be described in more detail with reference to FIG. 4. The steps of blocks 76 and 78 may be repeated (arrow 80) while fulfilling a data transfer request as described in more detail with reference to FIG. 4. More buffer descriptors may be generated as space becomes free in the payload cache 26 (arrow 82). The buffer descriptors may need to be processed by the interfaces 22 to provide the cache location in the payload cache 26. Once all the requested data has been transferred from the external device 38-1, the external device 38-1 may be configured to send an end-of-data notification to the processing core circuitry 30 which is received (block 84) by the interface 22-1 and transferred to the local CPU cache 32.

Figure 4:
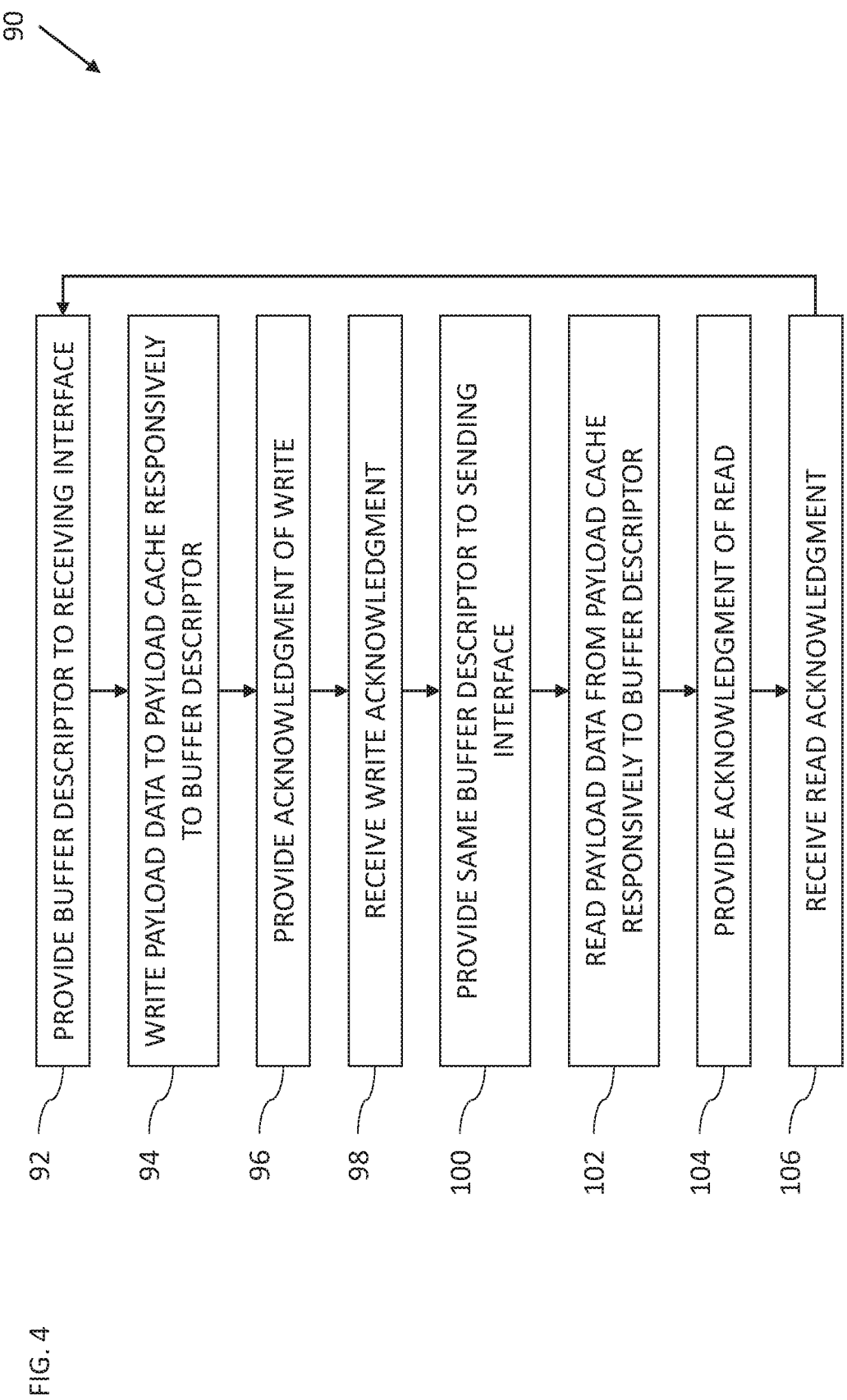
FIG. 4 is a flowchart including steps in a method to transfer payload data in the system of FIG. 1.

Reference is now made to FIG. 4, which is a flowchart 90 including steps in a method to transfer payload data in the system 10 of FIG. 1. Reference is also made to FIG. 1.

The processing core circuitry 30 is configured to provide (block 92) a buffer descriptor of a free memory location in the payload cache 26 to the interface 22-1. The processing core circuitry 30 may also send a request to the external device 38-1 to transfer a chunk of payload to the interface 22-1. In some embodiments, the processing core circuitry 30 may send a request to the external device 38-1 to transfer all of the requested data to the interface 22-1 and allow the interface 22-1 to control the data transfer from the external device 38-1 to the interface 22-1. The interface 22-1 is configured to write (block 94) payload data received from the external device 38-1 to the payload cache 26 responsively to the buffer descriptor provided by the processing core circuitry 30. The interface or the external device 38-1 is configured to provide (block 96) an acknowledgment of the write to the processing core circuitry 30. The acknowledgment is classified as control data and is transferred to the local CPU cache 32 for receipt (block 98) and processing by the processing core circuitry 30. In response to the write acknowledgment, the processing core circuitry 30 is configured to provide (block 100) the same buffer descriptor to the interface 22-2 (e.g. sending interface) and/or the external device 38-2. The processing core circuitry 30 may also send a request to the external device 38-2 to read payload data from the interface 22-2 according to the buffer descriptor. In response to the read request, the external device 38-2 may be configured to read data from the interface 22-2 according to the provided buffer descriptor. In some embodiments, the processing core circuitry 30 may send a request to the external device 38-2 to transfer all payload from the interface 22-2 and allow the interface 22-2 to control the data transfer from the payload cache 26 to the external device 38-2 according to the buffer descriptor(s) provided by the processing core circuitry 30. The interface 22-2 is configured to read (block 102) payload data from the payload cache 26 responsively to the provided buffer descriptor. Once the read has been successfully performed the interface 22-2 or the external device 38-2 is configured to provide (block 104) an acknowledgment of the read. The processing core circuitry 30 is configured to receive (block 106) the read acknowledgment and the buffer descriptor may be reused as the buffer descriptor now points to a free (or unused) memory location. The steps of blocks 92-106 may be repeated until all the payload for the request data is transferred from the external device 38-1 to the external device 38-2.

As previously mentioned, the accelerator(s) 28 may perform operations on the payload data stored in the payload cache 26. Therefore, between the steps of block 98 and 100, the processing core circuitry 30 may send a process request to the accelerator(s) 28 to process payload data stored in the payload cache 26. Once the accelerator(s) 28 has finished its processing, an acknowledgment is sent to the processing core circuitry 30.

It should be noted that the above process may be performed in parallel for two or more free memory locations associated with respective buffer descriptors.

Figure 5:
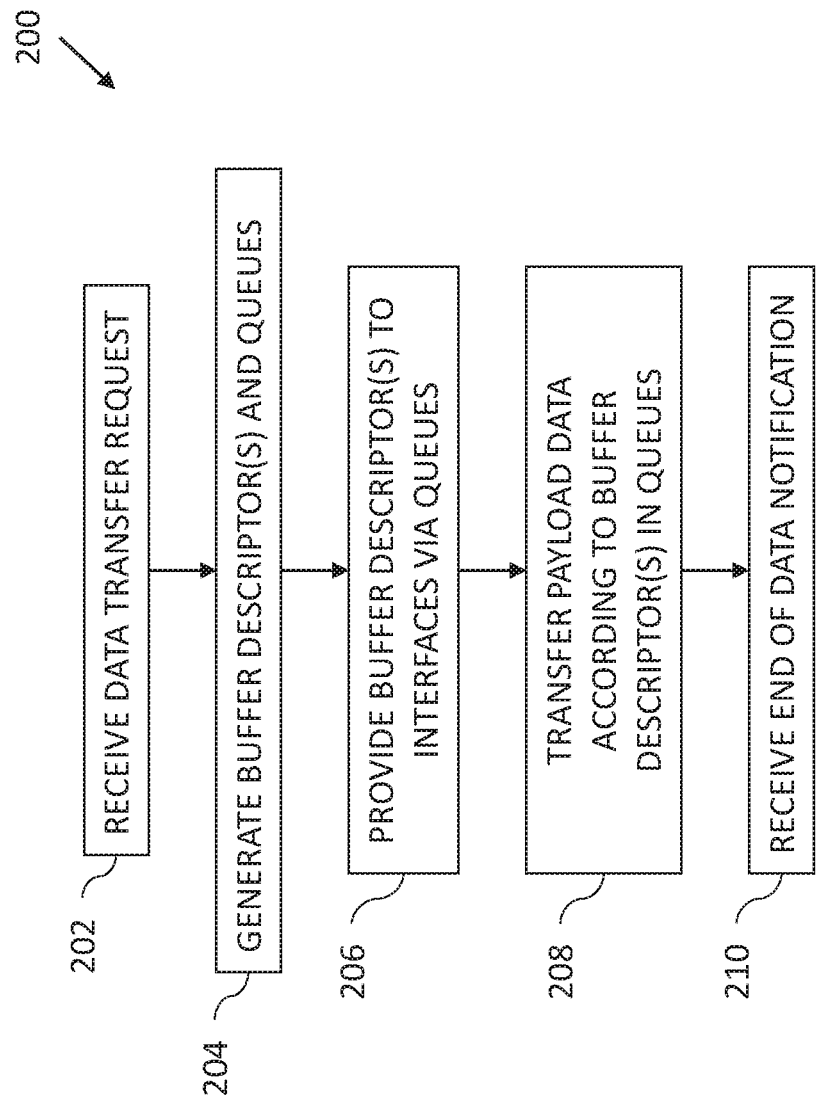
FIG. 5 is a flowchart including steps in a method to fulfil a data request based on queues in the system of FIG. 1.

Reference is now made to FIG. 5, which is a flowchart 200 including steps in a method to fulfil a data request based on queues in the system 10 of FIG. 1. Reference is also made to FIG. 1.

The processing core circuitry 30 is configured to manage at least one queue responsively to the buffer descriptors as described in more detail below and with reference to FIG. 6. The interfaces 22 are configured to transfer the payload data from the external device 38-1 to the external device 38-2 via the payload cache 26 responsively to the queue(s), as described in more detail below and with reference to FIG. 6. The queue(s) may be stored in the memory 16 (and cached to the local CPU cache 32 and local caches (not shown) of the interfaces 22 when being used by the processing core circuitry 30 and the interfaces 22, respectively) or in a shared cache shared by the processing core circuitry 30, the interface 22 and the accelerator(s) 28. The queue(s) may include the buffer descriptors, a work queue element (WQE), or a work descriptor based on buffer descriptors or any suitable data.

The interface is configured to receive (block 202) a data transfer request from the external device 38-2. The requested data is stored in the external device 38-1. The data transfer request is classified as control data by the classifier 24 and transferred to the local CPU cache 32 for processing by software of the processing core circuitry 30. The processing core circuitry 30 is configured to generate (block 204) one or buffer descriptors indicative of a free memory location or locations in the payload cache 26 and one or more queues. The processing core circuitry 30 is configured to provide (block 206) the buffer descriptor(s) to the interfaces 22 via one or more queues (e.g., in a receive queue for the interface 22-1 and in a send queue for the interface 22-2). Other completion queues may also be generated and managed for read and write acknowledgments. The interfaces 22 are configured to transfer (block 208) the payload data (provided by the device 38-1) from the device 38-1 to the device 38-2 via the payload cache 26 responsively to the provided buffer descriptor(s) in the queues. The buffer descriptors are used by the interfaces 22 to write data to the payload cache 26 and read data from the payload cache 26 as part of the data transfer request, as will be described in more detail with reference to FIG. 6. The steps of blocks 206 and 208 may be repeated while fulfilling a data transfer request as described in more detail with reference to FIG. 6. More buffer descriptors may be generated and added to the queues as space becomes free in the payload cache 26. The buffer descriptors may need to be processed by the interfaces 22 to provide the cache location in the payload cache 26. Once all the data has been transferred from the external device 38-1, the external device 38-1 may be configured to send an end-of-data notification to the processing core circuitry 30 which is received (block 210) by the interface 22-1 and transferred to the local CPU cache 32.

Reference is now made to FIG. 6, which is a flowchart 220 including steps in a method to transfer payload data based on queues in the system 10 of FIG. 1. Reference is also made to FIG. 1.

The processing core circuitry 30 is configured to provide (block 222) a buffer descriptor of a free memory location in the payload cache 26 in a receive queue, which is periodically read by the interface 22-1. The processing core circuitry 30 may also send a request to the external device 38-1 to transfer a chunk of payload to the interface 22-1. In some embodiments, the processing core circuitry 30 may send a request to the external device 38-1 to transfer all of the requested data to the interface 22-1 and allow the interface 22-1 to control the data transfer from the external device 38-1 to the interface 22-1. In response to reading the receive queue, the interface 22-1 is configured to write (block 224) payload data received from the external device 38-1 to the payload cache 26 responsively to the buffer descriptor provided in the receive queue by the processing core circuitry 30. The interface 22-1 is configured to provide (block 226) an acknowledgment of the write (referencing the buffer descriptor) via a write completion queue, which is periodically read by the processing core circuitry 30. In response to the write acknowledgment, the processing core circuitry 30 is configured to provide (block 228) the same buffer descriptor in a send queue, which is periodically read by the interface 22-2 (e.g. sending interface). In response to reading the send queue, the interface 22-2 is configured to read (block 230) payload data from the payload cache 26 responsively to the provided buffer descriptor in the send queue.

The processing core circuitry 30 may also send a request to the external device 38-2 to read payload data from the interface 22-2 according to the buffer descriptor. In response to the read request, the external device 38-2 may be configured to read data from the interface 22-2 according to the provided buffer descriptor. In some embodiments, the processing core circuitry 30 may send a request to the external device 38-2 to transfer all payload from the interface 22-2 and allow the interface 22-2 to control the data transfer from the payload cache 26 to the external device 38-2 according to the buffer descriptor(s) provided by the processing core circuitry 30 in the send queue. Once the read has been successfully performed the interface 22-2 is configured to provide (block 232) an acknowledgment of the read (referencing the buffer descriptor) in a read completion queue, which is periodically read by the processing core circuitry 30. In response to the read acknowledgment, the processing core circuitry 30 is configured to reuse (block 234) the buffer location as the buffer descriptor now points to a free memory location. The steps of blocks 222-234 may be repeated until all the payload for the request data is transferred from the external device 38-1 to the external device 38-2.

As previously mentioned, the accelerator(s) 28 may perform operations on the payload data stored in the payload cache 26. Therefore, between the steps of block 226 and 228, the processing core circuitry 30 may send a process request to the accelerator(s) 28 via a process queue (referencing the buffer descriptor) to process payload data stored in the payload cache 26. Once the accelerator(s) 28 has finished its processing, an acknowledgment is written to a process completion queue, which is periodically read by the processing core circuitry 30.

It should be noted that the above process may be performed in parallel for two or more free memory locations associated with respective buffer descriptors such that any one of the queues may include one, or two or more buffer descriptors depending on the stage of processing with respect to each of the memory locations in the payload cache 26.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A computer system, comprising:
 a payload sub-system comprising:
   interfaces configured to: connect with respective devices; transfer data with the respective devices; and receive write transactions from the respective devices;
   a classifier configured to classify the received write transactions into payload data and control data; and
   a payload cache configured to store the classified payload data; and
 a processing unit (PU) sub-system comprising:

a local PU cache configured to store the classified control data, wherein the payload cache and the local PU cache are different physical caches in respective different physical locations in the computer system; and processing core circuitry configured to execute software program instructions to perform control and packet processing responsively to the control data stored in the local PU cache.

2. The system according to claim 1, wherein the processing core circuitry is configured to manage transfer of the classified payload data from a first one of the devices to a second one of the devices via the interfaces and the payload cache.

3. The system according to claim 2, wherein:
the first device includes an external storage device directly connected to one of the interfaces; and
the second device includes a network node connected to one of the interfaces via a network.

4. The system according to claim 2, wherein:
the first device includes a first network node connected to one of the interfaces via a network; and
the second device includes a second network node connected to one of the interfaces via the network.

5. The system according to claim 2, wherein the processing core circuitry is configured to manage transfer of the classified payload data from the first device to the second device via the interfaces and the payload cache without the software accessing the payload cache.

6. The system according to claim 5, wherein the processing core circuitry is configured to manage transfer of the classified payload data from the first device to the second device via the interfaces and the payload cache without the software storing any of the classified payload data in the local PU cache.

7. The system according to claim 6, wherein:
the processing core circuitry is configured to:
generate buffer descriptors of respective free memory locations in the payload cache; and
provide the buffer descriptors to the interfaces; and
the interfaces are configured to transfer the payload data from the first device to the second device via the payload cache responsively to the provided buffer descriptors.

8. The system according to claim 7, wherein the processing core circuitry is configured to manage at least one queue responsively to the buffer descriptors, the interfaces being configured to transfer the payload data from the first device to the second device via the payload cache responsively to the at least one queue.

9. The system according to claim 1, wherein the payload cache is physically located closer to the interfaces than the processing core circuitry, and the local PU cache is physically located closer to the processing core circuitry than the interfaces.

10. The system according to claim 1, wherein the classifier is configured to classify the received write transactions into payload data and control data responsively to one or more of the following: data type; packet descriptor data; packet header data; data size; steering tag data; or address data.

11. The system according to claim 1, further comprising:
a memory configured to store data across a plurality of memory locations, the processing core circuitry being configured to cache cache-lines read from the memory at respective ones of the memory locations into the local PU cache;
an interconnect configured to:
manage read and write operations of the memory and the local PU cache;
maintain local cache location data of the cached cache-lines according to the respective memory locations of the cached cache-lines; and
maintain coherence of the memory, and wherein
the classifier is configured to classify the received write transactions into payload data and control data responsively to at leak some of the local cache location data and respective memory locations of the write transactions.

12. The system according to claim 1, wherein the payload sub-system further comprises at least one hardware accelerator configured to perform any one or more of the following: compute a checksum from the payload data stored in the payload cache; perform a redundancy check from the payload data stored in the payload cache; compress at least some of the payload data stored in the payload cache; or encrypt at least some of the payload data stored in the payload cache.

13. A method, comprising:
receiving write transactions from connected devices;
classifying the received write transactions into payload data and control data;
storing the classified payload data in a payload cache;
storing the classified control data in a local processing unit (PU) cache, wherein the payload cache and the local PU cache are different physical caches in respective different physical locations in a computer system; and
executing software program instructions to perform control and packet processing responsively to the control data stored in the local PU cache.

14. The method according to claim 13, wherein the executing software program instructions includes managing transfer of the classified payload data from a first one of the devices to a second one of the devices via the payload cache.

15. The method according to claim 14, wherein the software program manages the transfer of the classified payload data from the first device to the second device via the payload cache without the accessing the payload cache.

16. The method according to claim 15, wherein the software program manages the transfer of the classified payload data from the first device to the second device via the payload cache without storing any of the classified payload data in the local PU cache.

17. The method according to claim 16, further comprising:
generating buffer descriptors of respective free memory locations in the payload cache; and
transferring the payload data from the first device to the second device via the payload cache responsively to the buffer descriptors.

18. The method according to claim 17, further comprising:
managing at least one queue responsively to the buffer descriptors; and
transferring the payload data from the first device to the second device via the payload cache responsively to the at least one queue.

19. The method according to claim 13, wherein the classifying includes classifying the received write transactions into payload data and control data responsively to one or more of the following: data type; packet descriptor data; packet header data; data size; steering tag data; or address data.

20. The method according to claim 13, wherein the classifying includes classifying the received write transactions into payload data and control data responsively to: local cache location data maintained in a directory, which is maintained to provide coherence of a memory; and respective memory locations of the write transactions.

21. The method according to claim 13, further comprising performing any one or more of the following: computing a checksum from the payload data stored in the payload cache; performing a redundancy check from the payload data stored in the payload cache; compressing at least some of the payload data stored in the payload cache; or encrypting at leak some of the payload data stored in the payload cache.

* * * * *